US010415513B2

(12) United States Patent
Fischer

(10) Patent No.: US 10,415,513 B2
(45) Date of Patent: Sep. 17, 2019

(54) EGR SYSTEM WITH PARTICLE FILTER AND WASTEGATE

(71) Applicant: TENNECO GMBH, Edenkoben (DE)

(72) Inventor: Michael Fischer, Mainz (DE)

(73) Assignee: TENNECO GMBH, Edenkoben (DE)

( * ) Notice: Subject to any disclaimer, the term of this patent is extended or adjusted under 35 U.S.C. 154(b) by 62 days.

(21) Appl. No.: 14/721,288

(22) Filed: May 26, 2015

(65) Prior Publication Data

US 2016/0348615 A1    Dec. 1, 2016

(51) Int. Cl.
*F02M 26/04*    (2016.01)
*F02M 26/05*    (2016.01)
(Continued)

(52) U.S. Cl.
CPC ............ *F02M 26/04* (2016.02); *F02B 37/18* (2013.01); *F02M 26/05* (2016.02); *F02M 26/06* (2016.02);
(Continued)

(58) Field of Classification Search
CPC ........ F02M 26/05; F02M 26/06; F02M 26/07; F02M 26/22; F02M 26/33; F02M 26/35; F02M 26/44; F02D 41/083; F02D 41/086
See application file for complete search history.

(56) References Cited

U.S. PATENT DOCUMENTS 5,671,600 A * 9/1997 Pischinger ............ F02B 47/08
123/568.11
5,740,786 A * 4/1998 Gartner .................. F02B 25/06
123/556
(Continued)

FOREIGN PATENT DOCUMENTS

DE    102009022938 A1 * 6/2010 ............ F01N 3/106
DE    102009014277 A1    9/2010
(Continued)

OTHER PUBLICATIONS

FR 2894624 English Translation.*
JP 07259654 English Translation.*

*Primary Examiner* — Jason D Shanske
*Assistant Examiner* — Jessica L Kebea
(74) *Attorney, Agent, or Firm* — Hudak, Shunk & Farine Co. LPA

(57) ABSTRACT

An emissions control system for a gasoline engine having an exhaust gas conduit which can be connected to an exhaust manifold of the gasoline engine, having an inlet conduit which can be connected to an inlet manifold of the gasoline engine and having a turbine arranged in the exhaust gas conduit. At least one exhaust gas recirculation conduit is provided, which opens into the inlet conduit, and the exhaust gas conduit has at least one bypass conduit, which opens into the exhaust gas conduit downstream of the turbine, wherein a) the exhaust gas recirculation conduit branches off upstream of the turbine and the bypass conduit branches off at the exhaust gas recirculation conduit or b) the bypass conduit branches off upstream of the turbine and the exhaust gas recirculation conduit branches off at the bypass conduit, wherein c) at least one particulate filter, is arranged in the exhaust gas recirculation conduit or in the bypass conduit upstream of the exhaust gas recirculation conduit or in the exhaust gas conduit upstream of the exhaust gas recirculation conduit.

19 Claims, 3 Drawing Sheets

(51) Int. Cl.

| | | |
|---|---|---|
| *F02M 26/06* | (2016.01) | |
| *F02M 26/07* | (2016.01) | |
| *F02M 26/22* | (2016.01) | |
| *F02M 26/44* | (2016.01) | |
| *F02M 35/02* | (2006.01) | |
| *F02B 37/18* | (2006.01) | |
| *F02M 26/35* | (2016.01) | |

(52) U.S. Cl.
CPC ............ *F02M 26/07* (2016.02); *F02M 26/22* (2016.02); *F02M 26/35* (2016.02); *F02M 26/44* (2016.02); *F02M 35/02* (2013.01)

(56) References Cited

U.S. PATENT DOCUMENTS

| | | | | |
|---|---|---|---|---|
| 7,168,250 | B2 * | 1/2007 | Wei | F02B 37/013 123/568.12 |
| 7,444,804 | B2 * | 11/2008 | Hashizume | F01N 3/023 60/278 |
| 7,451,750 | B1 * | 11/2008 | Fox | F02B 29/0468 123/568.12 |
| 8,931,256 | B2 * | 1/2015 | Moravec | F02M 26/43 60/285 |
| 2008/0178843 | A1 * | 7/2008 | Duffy | F02B 29/0412 123/435 |
| 2008/0250775 | A1 * | 10/2008 | Bruck | B01D 39/2044 60/297 |
| 2009/0087365 | A1 * | 4/2009 | Klingmann | B01D 53/944 423/213.5 |
| 2010/0139267 | A1 * | 6/2010 | Schliesche | F02M 26/35 60/602 |
| 2011/0072788 | A1 * | 3/2011 | Ruona | F01N 3/023 60/276 |
| 2011/0302918 | A1 * | 12/2011 | Vollmer | F02M 26/07 60/605.2 |
| 2012/0042849 | A1 * | 2/2012 | Sangkyu | F02B 37/013 123/294 |
| 2014/0325980 | A1 * | 11/2014 | Iwasaki | F01P 3/20 60/599 |
| 2016/0097320 | A1 * | 4/2016 | Ohrem | F02M 26/05 60/599 |
| 2016/0265485 | A1 * | 9/2016 | Massard | F02D 41/005 |
| 2018/0202396 | A1 * | 7/2018 | Zhang | F02M 26/04 |

FOREIGN PATENT DOCUMENTS

| | | | | |
|---|---|---|---|---|
| DE | 102010046747 | A1 | 3/2011 | |
| DE | 102012021882 | A1 | 5/2014 | |
| DE | 102013003701 | A1 | 9/2014 | |
| DE | 102013008426 | A1 | 11/2014 | |
| EP | 1405995 | A1 | 4/2004 | |
| EP | 2151570 | A1 * | 2/2010 | ........... F01N 3/0807 |
| EP | 2395224 | A2 | 12/2011 | |
| EP | 2194351 | B1 | 5/2012 | |
| EP | 2669496 | A1 | 12/2013 | |
| FR | 2894624 | A1 * | 6/2007 | ............. F02B 37/18 |
| FR | 2992358 | A1 * | 12/2013 | ........... F01N 13/107 |
| JP | 07259654 | A * | 10/1995 | |
| JP | 3046707 | B2 * | 5/2000 | ............. F02M 26/36 |
| WO | WO 2007026432 | A1 * | 3/2007 | ............. F01N 5/025 |
| WO | 2008127755 | A2 | 10/2008 | |
| WO | WO 2016102798 | A1 * | 6/2016 | ............. F02M 26/07 |

* cited by examiner

EGR SYSTEM WITH PARTICLE FILTER AND WASTEGATE

FIELD OF THE INVENTION

The invention relates to an emissions control system for a gasoline engine having an exhaust gas conduit which can be connected to an exhaust manifold of the gasoline engine, having an inlet conduit which can be connected to an inlet manifold of the gasoline engine and having a turbine arranged in the exhaust gas conduit.

BACKGROUND OF THE INVENTION

An exhaust gas recirculation system for diesel engines is known from U.S. Pat. No. 5,671,600 A. A particulate filter, to which an exhaust gas recirculation conduit is connected, is provided at the exhaust gas outlet and/or at the exhaust gas conduit. Upstream of a charge-air compressor the exhaust gas recirculation conduit opens into the intake conduit. A valve for modifying the exhaust gas mass stream is provided inside the exhaust gas recirculation conduit. The particulate filter is used to protect the charge-air compressor and/or the charge-air cooler against pollution.

A particulate filter in the main exhaust gas stream of a gasoline engine is known from DE 10 2012 021 882 A1. Unlike in the case of a diesel engine, the particulate filter regenerates, to the greatest possible extent, without additional active measures, i.e. the particulate matter (soot particles with accumulated or enclosed hydrocarbons) retained until then burns under normal gasoline engine margin conditions primarily to form $CO_2$ and $H_2O$ respectively. For this purpose, sufficiently high exhaust gas temperatures of more than 500° C. as well as oxygen are required for combustion. This exhaust gas temperature is reached soon after starting the engine in an extremely wide variety of operating ranges of the gasoline engine. Since the vast majority of gasoline engines are operated stoichiometrically, the oxygen content in the exhaust gas can be too low to completely burn off the particulate matter contained in the filter. In this case, standard overrun cut-off phases of the gasoline engine help during transient operation, during which as a result of the elimination of the load requirement by the driver the injection of the engine is cut off for consumption reasons.

Since the engine acts as an engine brake and reduces the vehicle speed when the gear is engaged, clean air is flushed through the exhaust system by the dragged engine. This unburnt air encounters the particles previously heated by the engine exhaust gas in the particulate filter.

If the temperature is sufficient, these particles catch fire and burn, forming gases which can escape through the particulate filter, resulting in the particulate filter being cleaned.

Additional measures such as a secondary air system in order to actively achieve the regeneration of the particulate filter by means of excess air are known from DE 10 2013 003 701 A1, DE 10 2013 008 426.1 and WO 2008 127 755 A2.

SUMMARY OF THE INVENTION

The object of the invention is to configure and arrange an emissions control system for a gasoline engine such that an improved regeneration of the particulate filter is achieved.

The object is achieved according to the invention by the fact that at least one exhaust gas recirculation conduit is provided, which opens into the inlet conduit, and that the exhaust gas conduit has at least one bypass conduit which opens into the exhaust gas conduit downstream of the turbine, wherein a) the exhaust gas recirculation conduit branches off upstream of the turbine and the bypass conduit branches off at the exhaust gas recirculation conduit or b) the bypass conduit branches off upstream of the turbine and the exhaust gas recirculation conduit branches off at the bypass conduit, wherein c) at least one particulate filter is arranged in the exhaust gas recirculation conduit or in the bypass conduit upstream of the exhaust gas recirculation conduit or in the exhaust gas conduit upstream of the exhaust gas recirculation conduit and/or the bypass conduit.

If the bypass conduit branches off at the exhaust gas recirculation conduit, the branch is preferably downstream of the particulate filter of the exhaust gas recirculation conduit. The bypass conduit is therefore also supplied with the particulate filter.

The emissions control system described here basically has an exhaust gas recirculation system (EGR system). An EGR system usually comprises at least one exhaust gas recirculation conduit (EGR conduit), an exhaust gas recirculation cooler (EGR cooler) and an exhaust gas recirculation valve (EGR valve).

Deposits can be seen in the EGR system and in the air-intake system of gasoline engines, which can be referred to as "wet soot" or "fouling", which can result in serious effects such as reduced cooling capacity, clogging, poor uniform distribution as well as irregular combustion. This is why EGR systems have only rarely been used to date with gasoline engines and have limitations.

Cooling of the recirculated exhaust gas is advantageous for optimizing the combustion with EGR systems for gasoline engines, since a recirculation of uncooled exhaust gases, particularly at higher loads and at full load, results in higher suction temperatures as a result of the hot exhaust gases supplied. This, in turn, results in filling losses and an increase in the knocking tendency of the gasoline engine. These are accompanied by undesirable losses in performance of the engine. These disadvantages can be reduced by cooling the recirculated exhaust gas. However, this results in the production of an increased amount of condensates—consisting of water and/or hydrocarbons and hydrocarbon compounds respectively and incompletely burnt combustion residues—in the recirculated exhaust gas, resulting in a higher degree of sootiness in the form of wet adhesive deposits in the EGR system as well as in the air-intake system. A combination of the particulate filter with the charge-air cooler, as described for a diesel particulate filter in accordance with EP 2 194 351 B1, cannot therefore be considered, in order to avoid a risk of clogging due to the deposits described above in the particulate filter.

In addition, a particulate filter only reaches the required minimum temperature for the self-regeneration of the particulate filter in the particulate filter within a clearly limited operating range. In this case, additional active regeneration measures, which are disadvantageous for operational and cost reasons, are required. Unlike the wet components which are also conducted in gasoline exhaust gas, diesel particles are drier components which have a reduced tendency to condensate and stick together. In addition, active regeneration measures are generally required for the particulate filter in the diesel engine due to the lower prevailing exhaust gas temperatures in very wide engine operating ranges.

Like diesel particulate filters, particulate filters for gasoline engines also retain particles. Sufficiently high exhaust gas temperatures and excess oxygen are required to regenerate the particulate filter, i.e. to burn off filtered particles. Following a warming-up phase, these preconditions of the exhaust gas properties exist in EGR systems of gasoline engines. However, in wide operating ranges of the gasoline engine, i.e. in the fired condition (Lambda=1 in the case of stochiometrically operated gasoline engines), there is a lack of excess oxygen as a basis for complete combustion of the particles in the particulate filter. Therefore, particles are merely supplied to the particulate filter by the exhaust gas stream, are burnt there on the one hand with the available residual oxygen and, on the other hand, retained there until sufficiently good burning-off conditions exist for completely burning off the particles. A regeneration, i.e. a combustion of the particles, can only take place in the overrun phases of the engine, when the injection is cut off. In this overrun phase, i.e. when the engine continues rotating and the inlet and outlet valves are activated, oxygen reaches the EGR system, when the EGR valve is open, and flows through the particulate filter integrated therein. If the temperature in the particulate filter is sufficient, the particles are then combusted, forming $CO_2$. CO, HC and/or NOx may also be produced.

During overrun mode the EGR valves on the gasoline engine are usually closed, so as not to jeopardize the ignition of the engine which is to take place immediately in the event of a renewed load requirement by the driver or on reaching the idling speed of the engine due to as low a residual gas quantity as possible.

However, in order to allow regeneration of the particulate filter in the EGR conduit, for example during overrun mode, the EGR valve must be opened. Exhaust gas with a high oxygen content therefore flows through the particulate filter, regenerating the latter. This regeneration continues until such time as the particles and/or the exhaust gas fall(s) below the minimum temperature required for the regeneration due to the cooler air during overrun mode. The EGR valve could be closed at the latest at this time, in order to ensure that the engine combustion restarts as it should. However, it is not known when a renewed load requirement will be made by the driver.

A regeneration of the particulate filter in the EGR conduit is also possible when the EGR valve is closed thanks to the bypass conduit according to the invention. The bypass conduit branches off after the particulate filter and, if a turbocharger is used, preferably opens into the exhaust gas conduit after the turbine outlet.

On opening the bypass conduit, the portion of the exhaust gas stream conducted through the exhaust gas turbine is reduced. This is particularly the case if the pressure drop across the turbocharger is greater than that across the EGR bypass line. If the EGR conduit is closed, a corresponding portion of the exhaust gas stream can be conducted though the particulate filter and the bypass conduit. The regeneration of the particulate filter is therefore also favored in phases with a closed EGR valve, for example during overrun mode.

The oxygen-rich exhaust gas stream conducted through the particulate filter can, in addition, be significantly increased compared to solely flowing through the open EGR valve, and the regeneration can be intensified.

It is no longer necessary to prevent the regeneration of the particulate filter before restarting the engine. Similarly, the regeneration can take as long as is required for a regeneration phase during the overrun mode of a particulate filter installed in the main exhaust gas stream. The regeneration thus enabled can even surpass, in terms of its effectiveness, that of a particulate filter installed downstream in the main exhaust gas stream, since a higher thermal charging of the particulate filter takes place with the installation situation close to the engine, parallel to the turbocharger. As a result, the temperature of the particles in the particulate filter, for example during the overrun cut-off phase, is higher and the regeneration is more intensive.

Further advantages are associated with the bypass conduit according to the invention, which go beyond this improved regeneration of the particulate filter.

A portion of the exhaust gas is conducted past the exhaust gas turbine due to the bypass conduit which can also be switched on. The bypass conduit therefore also assumes the function of a wastegate valve which has previously been integrated into the housing of the turbine on conventional turbochargers. Therefore, not only can the bypass conduit be used during overrun mode, but it can also be used under full load conditions of the gasoline engine, if the exhaust gas energy exceeds the necessary driving power for the compressor of the exhaust gas turbocharger. The particulate filter can also be regenerated in this case, because of the residual oxygen contained in the exhaust gas and the high exhaust gas temperature.

In addition, other advantages are associated with the bypass conduit according to the invention, particularly during the start and/or cold start phase of the engine.

The bypass conduit can also be open in the case of the engine start. During and following the engine start and/or engine cold start, the turbocharger does not yet provide its recharging function, as the exhaust gas energy is too low for this at these operating points. On the contrary, the exhaust gas turbine represents a flow resistance, which adversely affects the operation of the engine. This disadvantage is reduced by deflecting the exhaust gas stream through the bypass conduit.

In addition to the amount of air needed for the regeneration it can be necessary to deliberately increase the exhaust gas temperature in order to achieve the necessary exhaust gas temperature for the regeneration. To this end, the following measures which are known from the prior art are possible: spark retard, shifting of operation range or heating.

To this end, it can also be advantageous if the at least one particulate filter is uncoated or if the particulate filter has a catalytically acting coating to convert CO, HC, and/or NOx. A coating of the particulate filter, in turn, leads to reduced pollutant emissions in the air-intake system which can, in addition, advantageously affect the combustion. The coating of the particulate filter has an effect during fired engine operation. The same applies to the filtering effect of the particulate filter. The particulate filter can be regenerated during overrun mode. By combining particle filtration and catalytic conversion of additional incomplete combustion products, the exhaust gas fed back to the engine has a high degree of purity both in terms of the combustion products and in terms of the particles. This has a positive effect on the prevention of deposits in the air-intake system as well as on combustion, therefore the pollutant emissions and the efficiency of the gasoline engine.

In connection with the configuration and arrangement according to the invention it can be advantageous if a cooler is provided inside the exhaust gas recirculation conduit downstream of the particulate filter. The cooler is spatially and/or at least thermally separated from the particulate filter, so that the particulate filter has high temperatures, if at all possible, in a wide range of operating conditions of the engine, allowing it to regenerate if there is a sufficient excess of oxygen in the exhaust gas due to oxidation of the filtered components. As large a working range as possible of the particulate filter is therefore achieved for regeneration. The cooler is either configured as an exhaust-air, exhaust gas-engine cooling water or as an exhaust gas-low temperature cooling water cooler. In particular embodiments multiple exhaust gas recirculation coolers, which can also be configured so that they can be switched on, can be arranged in series or parallel.

It can be particularly advantageous if the cooler has, on the outlet side, a nominal exhaust gas temperature Ta, which is above the dew point of the substances contained in the exhaust gas, for example, 250° C.>=Ta>=100° C. or 250° C.>=Ta>=105° C. The nominal exhaust gas temperature Ta selected is thus sufficiently high to prevent condensation of the water contained in the exhaust gas. This condition should apply to a majority of operating conditions. Excessive contamination of the EGR system can therefore be prevented. Cooling to below 100° C. only takes place in the second cooling stage following mixing of the exhaust gas and fresh air in the inlet conduit and/or in the charge-air conduit shortly before entering the engine. As a result, condensing water can find its way directly into the engine combustion chamber and have a positive effect on engine combustion through evaporation. As explained below, there is no risk of sootiness for the charge-air cooler located close to the engine due to the particulate filter despite the further cooling of the charge air.

It can be advantageous for the inlet conduit upstream of the opening of the exhaust gas recirculation conduit to be configured as a fresh air conduit, and for at least one fresh air cooler and a fresh air throttle valve to be provided in the fresh air conduit. Separate cooling of the fresh air prior to mixing with the exhaust gas can be carried out by means of the fresh air cooler. However, because the temperature level of the compressed fresh air is not so very high at 150° C. to 160° C., the separate cooling of the fresh air can also be dispensed with, wherein the mixture of fresh air-exhaust gas as described above can be cooled together.

It can also be advantageous if the fresh air cooler has, on the outlet side, a nominal fresh air temperature Tf, where 150° C.>=Tf>=60° C. The cooling capacity in the fresh air system is, in any case, advantageous in terms of as cool as possible a mixture of fresh air and exhaust gas.

It can also be advantageous if the inlet conduit downstream of the opening of the exhaust gas recirculation conduit is configured as a charge-air conduit and if at least one charge-air cooler is provided in the charge-air conduit. The purification of the recirculated exhaust gas by the particulate filter guarantees the effective use of the charge-air cooler for the mixture of fresh air and exhaust gas. The use of the particulate filter prevents sootiness of the charge-air cooler. The effect that soot particles and the exhaust gas temperature can be clearly reduced during high-load operation due to the particulate filter in the EGR conduit can be increased by the intensive EGR and charge-air cooling to such an extent that the exhaust gas temperature can fall to the level of diesel engines and/or the suction temperature can drop to the level of gasoline engines without EGR prior to entering the cylinder. The knocking tendency of the gasoline engine falls significantly as a result and significant consumption improvements can be achieved. This is achieved by the two-stage and/or three-stage cooling of the charge air sucked in by the EGR cooler, the charge-air cooler and, if necessary, the fresh air cooler, using the different temperature levels.

The branch of the EGR conduit upstream of the turbine guarantees higher exhaust gas temperatures, which has a positive effect overall on the particulate filter regeneration and the reduction of pollutants. The opening downstream of the compressor has the advantage that the control line is shorter. This combination of the branch upstream of the turbine and the opening downstream of the compressor is referred to as a high-pressure EGR (HP EGR). However, a sufficiently high pressure gradient between the exhaust system and the air-intake system for supplying the required volume of recirculated exhaust gas may not be available in all desired operating conditions. In the event that additional cooling of the recirculated exhaust gas is required, the purified exhaust gas can also be supplied to the air-intake system after the compressor and before the charge-air cooler. The exhaust gas is therefore not only cooled in the EGR cooler, but also in the charge-air cooler. An arrangement is also conceivable, in which the charge-air cooler is designed so effectively that no EGR cooler is required in the EGR conduit for the recirculated exhaust gas.

The branch upstream of the turbine combined with the opening upstream of the compressor is referred to as a maximum-pressure EGR (MP EGR) and guarantees a large pressure difference inside the EGR conduit, even if larger exhaust gas recirculation volumes are required. However, as a result, the control line is longer than is the case with the HP EGR, and the compressor and the turbine may have to be adapted to the changing mass flow rates.

The branch downstream of the turbine combined with the opening upstream of the compressor is referred to as a low-pressure EGR (LP EGR).

To this end, it can be advantageous if the charge-air cooler has, on the outlet side, a nominal charge-air temperature Tu, where Tu<=60° C. Due to the intensive cooling of the charge air the exhaust gas temperature of the gasoline engine can be reduced to the level of diesel engines (approx. 850° C.). This has a very positive effect on the knocking tendency of the gasoline engine and significant improvements in fuel consumption are possible.

It can additionally be advantageous if an EGR valve is provided in the exhaust gas recirculation conduit, by means of which, depending on the operating point, an exhaust gas mass stream can be adjusted inside the exhaust gas recirculation conduit. The EGR valve is advantageously located downstream of the particulate filter. During overrun phases of the engine, the regeneration of the particulate filter can be influenced with the EGR valve by means of the volume of recirculated fresh air. A positioning before the particulate filter results in increased pollution of the EGR valve and is only considered in exceptional cases. In addition, it can be advantageous if the EGR valve is provided downstream of the cooler. It is therefore protected against excessive temperature load.

It can also be advantageous if a bypass throttle valve is provided in the bypass conduit, by means of which, depending on the operating point, an exhaust gas mass stream can be adjusted inside the bypass conduit.

It can additionally be advantageous if an additional exhaust gas recirculation conduit having an additional EGR valve is provided, which branches off at the exhaust gas recirculation conduit or which branches off at the bypass conduit, wherein the additional exhaust gas recirculation conduit opens into the inlet conduit upstream of the compressor. Therefore, as an alternative to the EGR conduit, the additional EGR conduit can be used. Both EGR conduits can also be used together.

In addition, it can be advantageous if an exhaust gas catalytic convertor is provided downstream of the turbine. The exhaust gas catalytic convertor is preferably located downstream of the opening of the bypass conduit. The aforementioned advantages of reduced emissions of pollutants in the main exhaust gas line are achieved by the 3-way catalytic convertor and/or the oxidation catalytic convertor.

As the exhaust gas to be recirculated is extracted before the catalytic convertor of the exhaust system, an additional 3-way catalytic convertor or an oxidation catalytic convertor can be integrated into the exhaust gas recirculation conduit instead of a coated particulate filter. However, these catalytic convertors represent a further component which can alternatively be avoided with a catalytically coated particulate filter. In any case, the oxidation of pollutant components leads to the development of heat and, therefore, the heating of the particulate filter located downstream. This extends the use of the independent regeneration of the particulate filter during overrun mode to other operating conditions.

In addition, a supply of secondary air can be provided, by means of which secondary air can be introduced into the exhaust gas recirculation conduit and/or into the bypass conduit, and an appropriate device can be provided for this purpose. The secondary air can also be introduced into the exhaust gas conduit upstream of the exhaust gas recirculation conduit and/or upstream of the bypass conduit. A use of secondary air, with which the exhaust gas conduit and, therefore, the particulate filter are supplied with additional oxygen for the regeneration, can also be advantageous. However, care must be taken to ensure that the additional flow of air is actually conducted through the particulate filter as well. The EGR valve should therefore be open when using the secondary air pump. In addition or alternatively, the bypass conduit can also be open. However, when the EGR valve is closed, the bypass conduit must be open. For this purpose, a standard point of introduction can be used for the secondary air close to the outlet valve in the cylinder head outlet duct. The secondary air can be provided by means of a separate secondary air pump, or by means of the charge-air compressor, if the existing pressure levels guarantee this.

The object is also achieved by an exhaust system and/or a gasoline engine having an emissions control system as described above.

The object is also achieved by a process for operating a gasoline engine having an emissions control system or an exhaust system as described above, wherein a) during operation and/or during the overrun mode of the gasoline engine with the EGR valve at least partially closed, at least a portion of the exhaust gas stream is conducted through the particulate filter and through the at least partly open bypass conduit, wherein a regeneration of the particulate filter is carried out and/or made possible; b) during and following the start of the gasoline engine with at least a partially closed EGR valve at least a portion of the exhaust gas stream is conducted through the particulate filter and through the bypass conduit past the turbine by opening the bypass throttle valve until a given exhaust gas pressure is reached; c) during the full-load operation of the gasoline engine, or at least close to full load, the bypass conduit is used as a wastegate in order to conduct at least a portion of the exhaust gas stream past the turbine, wherein regeneration of the particulate filter is carried out and/or made possible as a result. The EGR valve can be at least partially open or completely open during this.

By using the bypass conduit according to the invention the engine behavior and/or the pollutant emission can be significantly improved at different operating points.

To this end, it can be advantageous if on introducing secondary air through the device a) the EGR valve is opened and, optionally, exhaust gas is additionally conducted through the bypass conduit, wherein the bypass throttle valve is at least partially open or b) the EGR valve is closed and, alternatively, exhaust gas is conducted through the bypass conduit, wherein the bypass throttle valve is at least partially open. The mass stream additionally introduced can be carried away via the bypass conduit or the EGR conduit. In the latter case, an improved regeneration of the particulate filter is guaranteed.

BRIEF DESCRIPTION OF THE DRAWINGS

Further advantages and details of the invention are explained in the claims and in the specification, and illustrated in the figures, where:

DETAILED DESCRIPTION OF THE INVENTION

Figure 1:
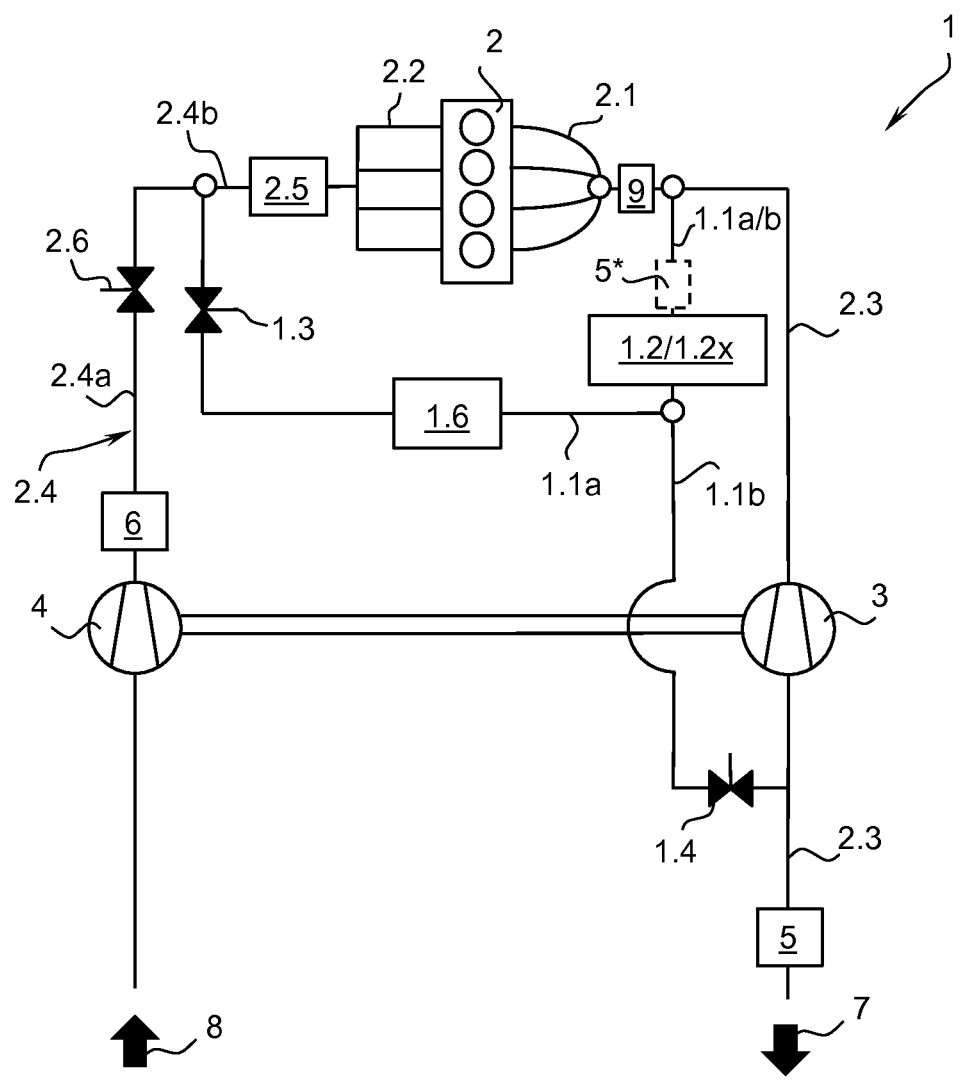
FIG. 1 shows a schematic diagram of an HP EGR having a bypass conduit.
Figure 2:
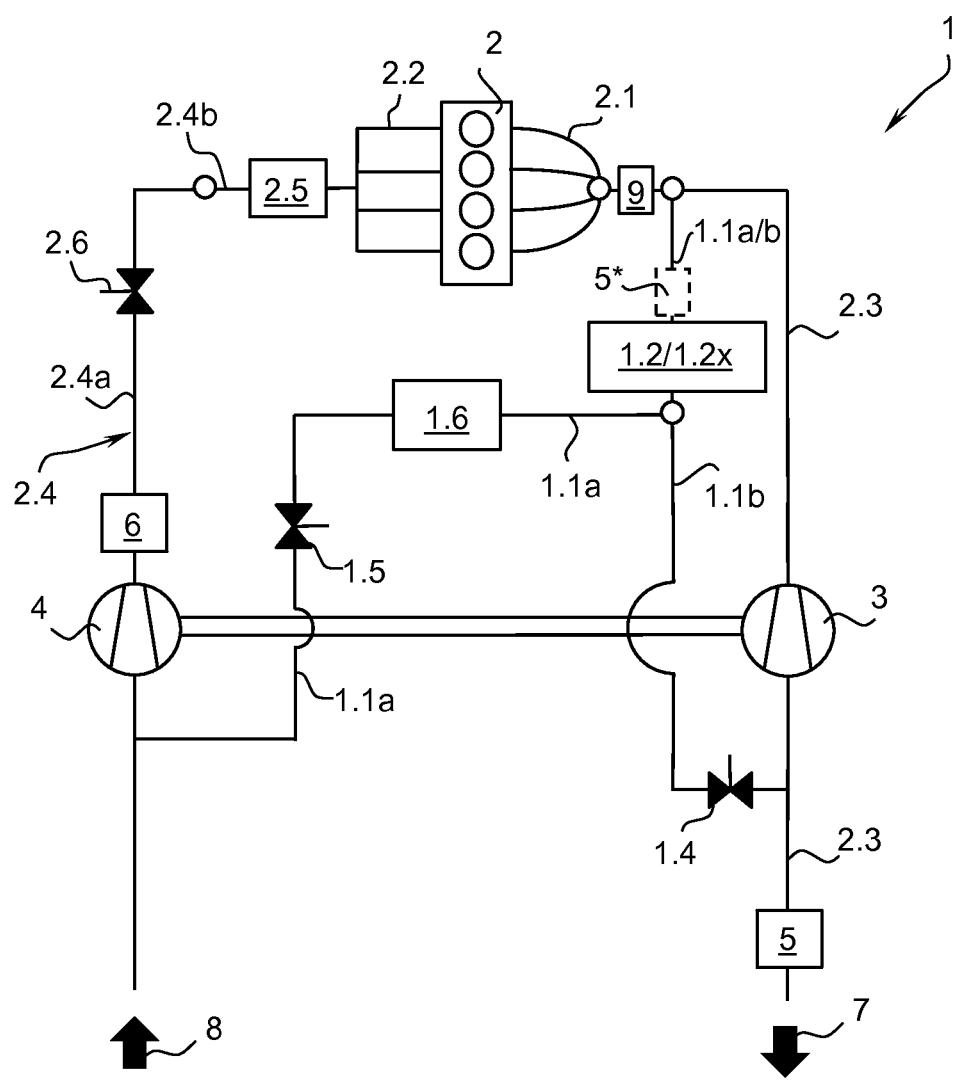
FIG. 2 shows a schematic diagram of an MP EGR having a bypass conduit.
Figure 3:
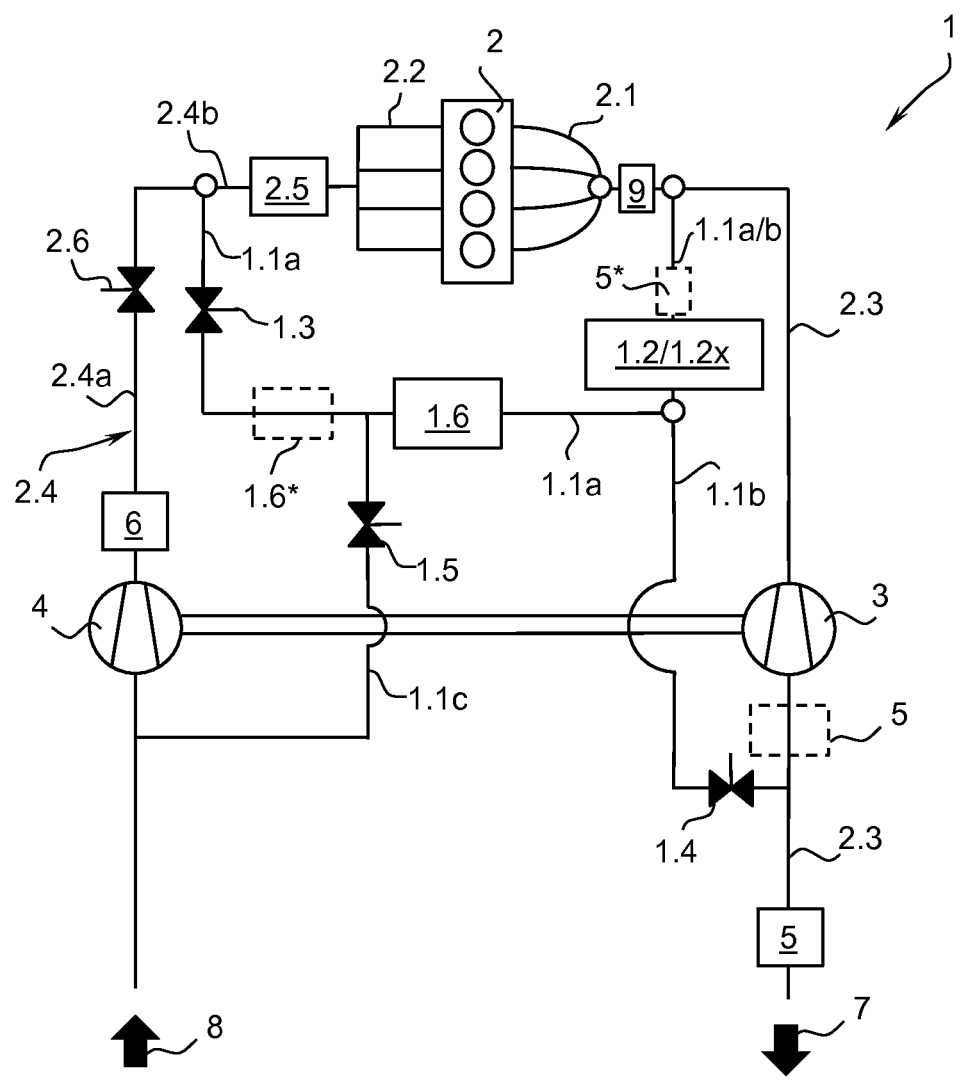
FIG. 3 shows a schematic diagram of a combined HP EGR and MP EGR having a bypass conduit.

All of the schematic diagrams according to FIGS. 1-3 show an emissions control system 1 (EGR system) which is integrated into the exhaust gas and charge-air system of a gasoline engine 2 having an exhaust manifold 2.1 and an inlet manifold 2.2 as well as having an exhaust gas turbine 3 and a charge-air compressor 4. The exhaust and charge-air system has an exhaust gas conduit 2.3 which is connected to the exhaust manifold 2.1 of the gasoline engine 2, into which exhaust gas conduit the turbine 3 is integrated. At the end of the exhaust gas conduit 2.3, exhaust gas 7 leaves the emissions control system 1 and flows into the other exhaust line which is not shown. In addition, an inlet conduit 2.4 connected to the intake manifold 2.2 of the gasoline engine 2 is provided, into which the compressor 4 is integrated. The inlet conduit 2.4 is supplied with fresh air 8 by means of an air supply system which is not shown. In addition, at least one exhaust gas recirculation conduit (EGR conduit) 1.1a is provided with an EGR valve 1.3, which branches off at the exhaust gas conduit 2.3 and opens into the inlet conduit 2.4.

In addition, a bypass conduit 1.1b is provided, which also branches off at the exhaust gas conduit 2.3 and opens into the exhaust gas conduit 2.3 downstream of the turbine 3. It is irrelevant whether the bypass conduit 1.1b branches off at the exhaust gas recirculation conduit 1.1a or whether the exhaust gas recirculation conduit 1.1a branches off at the bypass conduit 1.1b. The bypass conduit 1.1b has a bypass throttle valve 1.4 for regulating the gas mass stream.

A particulate filter 1.2, 1.2x, which filters the recirculated exhaust gas 7 and/or exhaust gas 7 to be recirculated, is arranged in the EGR conduit 1.1a. The particulate filter 1.2x can be coated and perform the tasks of a 3-way catalytic convertor or at least an oxidation catalytic convertor. Alternatively, the particulate filter 1.2 can also be uncoated. In this case, an exhaust catalytic convertor 5* may be necessary which is, for example, located upstream of the particulate filter 1.2 (shown dashed), in order to guarantee a catalytic purification of the recirculated exhaust gas 7.

In addition, at least one EGR cooler 1.6 is provided in the EGR conduit 1.1a downstream of the particulate filter 1.2, 1.2x. An EGR valve 1.3 for regulating the mass stream inside the EGR conduit 1.1a is located downstream of the respective EGR cooler 1.6 and/or before the opening into the inlet conduit 2.4.

A charge-air and/or fresh air throttle valve 2.6 is provided in the inlet conduit 2.4 upstream of the point of introduction of the exhaust gas recirculation conduit 1.1a into the inlet conduit 2.4. This part of the inlet conduit 2.4 is also referred to as a fresh air conduit 2.4a. A charge-air and/or fresh air cooler 6 is also provided inside the fresh air conduit 2.4a.

A catalytic convertor 5, which is configured as a 3-way catalytic convertor or as an oxidation catalytic convertor, is provided downstream of the turbine 3 in the exhaust gas conduit 2.3. Notwithstanding the embodiment examples described below, the catalytic convertor 5 used in each case can, in principle, be a 3-way catalytic convertor or an oxidation catalytic convertor. An oxidation catalytic convertor 5 is in particular considered if the engine concerned is a gasoline engine 2 operated under lean conditions.

In addition to the EGR cooler 1.6 and the fresh air cooler 6, a charge-air cooler 2.5 is located in the inlet conduit 2.4 downstream of the point of introduction of the exhaust gas recirculation conduit 1.1a. This portion of the inlet conduit 2.4 downstream of the point of introduction of the exhaust gas recirculation conduit 1.1a is also referred to as a charge-air conduit 2.4b.

In addition, a device 9 for introducing secondary air is provided on the exhaust gas side in the cylinder head and/or in the exhaust manifold 2.1 or in the exhaust gas conduit 2.3.

Basically, a distinction is made between three variants of exhaust-gas recirculation, depending on the branch of the EGR conduit 1.1a of the exhaust gas conduit 2.3 and the opening of the EGR conduit 1.1a into the inlet conduit 2.4.

The combination of the branch of the EGR conduit 1.1a upstream of the turbine 3 and the opening of the EGR conduit 1.1a downstream of the compressor 4 is referred to as a high-pressure EGR (HP EGR).

The combination of the branch of the EGR conduit 1.1a upstream of the turbine 3 and the opening of the EGR conduit 1.1a upstream of the compressor 4 is referred to as a maximum-pressure EGR (MP EGR).

The combination of the branch of the EGR conduit 1.1a downstream of the turbine 3 and the opening upstream of the compressor 4 is referred to as a low-pressure EGR (LP EGR).

The diagram according to FIG. 1 shows a HP EGP, formed by the EGR conduit 1.1a, which branches off upstream of the turbine 3 and which opens downstream of the compressor 4. The opening is effected downstream of the charge-air and/or fresh air throttle valve 2.6.

FIG. 2 shows a configuration of a MP EGR.

The embodiment example according to FIG. 3 combines an HP EGR and an MP EGR. An additional EGR conduit 1.1c having an additional EGR valve 1.5 branches off at the bypass conduit 1.1b downstream of the cooler 1.6. An additional EGR valve 1.5 is provided in the EGR conduit 1.1c. The EGR conduit 1.1c opens into the inlet conduit 2.4 upstream of the compressor 4. The EGR cooler 1.6* can alternatively also be positioned downstream of the branch for the additional EGR conduit 1.1c. The bypass conduit 1.1b can also open downstream of the catalytic convertor 5 (shown dashed). This also applies to the embodiment examples according to FIG. 1 and FIG. 2.

LIST OF REFERENCE NUMERALS

1 Exhaust system/Emissions control system
1.1a Exhaust gas recirculation conduit, EGR conduit
1.1a/b EGR conduit/Bypass conduit
1.1b Bypass conduit
1.1c Additional exhaust gas recirculation conduit, EGR conduit
1.2 Particulate filter
1.2x Particulate filter, coated
1.3 EGR valve
1.4 Bypass throttle valve of 1.1b
1.5 Additional EGR valve
1.6 Cooler, EGR cooler
1.6* Cooler alternative position
2 Gasoline engine
2.1 Exhaust manifold
2.2 Inlet manifold
2.3 Exhaust gas conduit
2.4 Inlet conduit
2.4a Fresh air conduit
2.4b Charge-air conduit
2.5 Charge-air cooler
2.6 Charge-air throttle valve, fresh air throttle valve
3 Turbine
4 Compressor, charge-air compressor
5 Catalytic convertor, 3-way catalytic convertor, oxidation catalytic convertor
5* Exhaust gas catalytic convertor, 3-way and/or oxidation catalytic convertor, as an alternative
6 Charge-air cooler, fresh air cooler
7 Exhaust gas
8 Fresh air
9 Device for introducing secondary air

What is claimed is:

1. An emissions control system for a gasoline engine, comprising:
    an exhaust gas conduit connectable to an exhaust manifold of the gasoline engine, having;
    an inlet conduit connected to an inlet manifold of the gasoline engine;
    a turbine arranged in the exhaust gas conduit;
    at least one exhaust gas recirculation conduit branching off upstream of the turbine and opening into the inlet conduit;
    at least one bypass conduit branching off the at least one exhaust gas recirculation conduit upstream of the turbine for carrying exhaust gas during recirculation and opening into the exhaust gas conduit downstream of the turbine;
    at least one particulate filter arranged in the at least one exhaust gas recirculation conduit upstream of the branch of the at least one bypass conduit or in the exhaust gas conduit upstream of the at least one exhaust gas recirculation conduit,
    wherein the at least one particulate filter has a catalytically acting coating for converting CO, HC and NOx;
    an EGR valve is provided in the at least one exhaust gas recirculation conduit, which, depending on an operating point, adjusts an exhaust gas mass stream inside the at least one exhaust gas recirculation conduit, wherein the EGR valve is positioned downstream of the branch of the bypass conduit;
    a bypass throttle valve is provided in the at least one bypass conduit, which, depending on the operating point, adjusts the exhaust gas mass stream inside the at least one bypass conduit; and
    a cooler provided inside the at least one exhaust gas recirculation conduit downstream of the at least one particulate filter;
    wherein the cooler is positioned downstream of the branch of the at least one bypass conduit, and upstream of the EGR valve, and wherein an exhaust gas catalytic convertor is provided downstream of the turbine, wherein the exhaust gas catalytic convertor is a three-way catalytic converter.

2. The emissions control system according to claim 1, wherein the emissions control system is structurally configured such that on an outlet side of the cooler, a nominal exhaust gas temperature Ta is maintained above the dew point of the substances contained in the exhaust gas.

3. The emissions control system according to claim 1, wherein the inlet conduit upstream of the opening of the at least one exhaust gas recirculation conduit is configured as a fresh air conduit and at least one fresh air cooler and a fresh air throttle valve are provided in the fresh air conduit.

4. The emissions control system according to claim 3, wherein the emissions control system is structurally configured such that on an outlet side of the at least one fresh air cooler a nominal fresh air temperature Tf is maintained to be greater than or equal to 60° C. and less than or equal to 150° C.

5. The emissions control system according to claim 1, wherein the inlet conduit downstream of the opening of the at least one exhaust gas recirculation conduit is configured as a charge-air conduit and at least one charge-air cooler is provided in the charge-air conduit.

6. The emissions control system according to claim 5, wherein the emissions control system is structurally configured such that on an outlet side of the at least one charge-air cooler a nominal charge-air temperature Tu is maintained to be less than or equal to 60° C.

7. The emissions control system according to claim 1, wherein an additional exhaust gas recirculation conduit is provided with an additional EGR valve, which branches off at the at least one exhaust gas recirculation conduit or which branches off at the at least one bypass conduit, wherein the additional exhaust gas recirculation conduit opens into the inlet conduit upstream of a compressor.

8. The emissions control system according to claim 1, further including a secondary air pump or a charge-air compressor, by which secondary air is introduced into the at least one exhaust gas recirculation conduit and/or into the at least one bypass conduit.

9. An exhaust gas system and/or a gasoline engine having the emissions control system according to claim 1.

10. The emissions control system according to claim 1, wherein on the an outlet side of the cooler, a nominal exhaust gas temperature Ta is maintained above the dew point of the substances contained in the exhaust gas, wherein the inlet conduit upstream of the opening of the at least one exhaust gas recirculation conduit is configured as a fresh air conduit and at least one fresh air cooler and a fresh air throttle valve are provided in the fresh air conduit, wherein on an outlet side of the at least one fresh air cooler a nominal fresh air temperature Tf is maintained to be greater than or equal to 60° C. and less than or equal to 150° C.

11. The emissions control system according to claim 10, wherein the inlet conduit downstream of the opening of the at least one exhaust gas recirculation conduit is configured as a charge-air conduit and at least one charge-air cooler is provided in the charge-air conduit, wherein on an outlet side of the at least one charge-air cooler a nominal charge-air temperature Tu is maintained to be less than or equal to 60° C.

12. The emissions control system according to claim 11, wherein an additional exhaust gas recirculation conduit is provided with an additional EGR valve, which branches off at the at least one exhaust gas recirculation conduit or which branches off at the at least one bypass conduit, wherein the additional exhaust gas recirculation conduit opens into the inlet conduit upstream of a compressor, wherein a secondary air pump or a charge-air compressor is provided, by which secondary air is introduced into the at least one exhaust gas recirculation conduit and/or into the at least one bypass conduit.

13. A process for operating a gasoline engine having an emissions control system comprising:
   an exhaust gas conduit connectable to an exhaust manifold of the gasoline engine, having;
   an inlet conduit connected to an inlet manifold of the gasoline engine;
   a turbine arranged in the exhaust gas conduit;
   at least one exhaust gas recirculation conduit branching off upstream of the turbine and opening into the inlet conduit;
   at least one bypass conduit branching off the at least one exhaust gas recirculation conduit upstream of the turbine for carrying exhaust gas during recirculation and opening into the exhaust gas conduit downstream of the turbine;
   at least one particulate filter arranged in the at least one exhaust gas recirculation conduit upstream of the branch of the at least one bypass conduit or in the exhaust gas conduit upstream of the at least one exhaust gas recirculation conduit;
   an EGR valve is provided in the at least one exhaust gas recirculation conduit, which, depending on an operating point, adjusts an exhaust gas mass stream inside the at least one exhaust gas recirculation conduit,
   wherein the EGR valve is positioned downstream of the branch of the bypass conduit; a bypass throttle valve is provided in the at least one bypass conduit, which, depending on the operating point, adjusts the exhaust gas mass stream inside the at least one bypass conduit; and
   a cooler provided inside the at least one exhaust gas recirculation conduit downstream of the at least one particulate filter;
   wherein the cooler is positioned downstream of the branch of the at least one bypass conduit, the process comprising the steps of:
   a) operating the gasoline engine with the EGR valve at least partially closed and conducting at least a portion of the exhaust gas stream, through the at least one particulate filter and through the at least one bypass conduit, wherein regeneration of the at least one particulate filter is carried out;
   b) conducting, during and after the start of the gasoline engine with the EGR valve at least partially closed at least a portion of the exhaust gas stream, through the at least one particulate filter and through the at least one bypass conduit past the turbine by opening a bypass throttle valve, until a given exhaust gas pressure is reached;
   c) adjusting the bypass throttle valve in the at least one bypass conduit, during full-load operation of the gasoline engine, to conduct at least a portion of the exhaust gas stream to bypass the turbine, wherein regeneration of the at least one particulate filter is carried out.

14. The process according to claim 13, wherein on introducing secondary air through a secondary air pump or a charge-air compressor, the method further comprises
   a) opening the EGR valve and additionally conducting exhaust gas through the at least one bypass conduit or b) closing the EGR valve and alternatively exhaust gas is conducted through the at least one bypass conduit.

15. The process according to claim 14, further including introducing the secondary air injection into the EGR conduit.

16. An emissions control system for a gasoline engine, comprising:
   an exhaust gas conduit connectable to an exhaust manifold of the gasoline engine, having;
   an inlet conduit connected to an inlet manifold of the gasoline engine;
   a turbine arranged in the exhaust gas conduit;
   at least one exhaust gas recirculation conduit branching off upstream of the turbine and opening into the inlet conduit upstream of a compressor;
   at least one bypass conduit branching off the at least one exhaust gas recirculation conduit upstream of the turbine for carrying exhaust gas during recirculation and opening into-to the exhaust gas conduit downstream of the turbine;
   at least one particulate filter arranged in the at least one exhaust gas recirculation conduit upstream of the branch of the at least one bypass conduit or in the exhaust gas conduit upstream of the at least one exhaust gas recirculation conduit;
   an exhaust gas catalytic converter is provided downstream of the turbine, wherein the exhaust gas catalytic converter is a three-way catalytic converter, and wherein the at least one particulate filter has a catalytically acting coating for converting CO, HC and NOx;
   an EGR valve is provided in the at least one exhaust gas recirculation conduit, which, depending on an operating point, adjusts an exhaust gas mass stream inside the at least one exhaust gas recirculation conduit, wherein the EGR valve is positioned downstream of the branch of the bypass conduit;
   a bypass throttle valve is provided in the at least one bypass conduit, which, depending on the operating point, adjusts the exhaust gas mass stream inside the at least one bypass conduit; and
   a cooler provided inside the at least one exhaust gas recirculation conduit downstream of the at least one particulate filter;
   wherein the cooler is positioned downstream of the branch of the at least one bypass conduit, and upstream of the EGR valve.

17. An emissions control system for a gasoline engine, comprising:
   an exhaust gas conduit connectable to an exhaust manifold of the gasoline engine, having;
   an inlet conduit connected to an inlet manifold of the gasoline engine;
   a turbine arranged in the exhaust gas conduit; at least one exhaust gas recirculation conduit branching off upstream of the turbine and opening into the inlet conduit downstream of the compressor;
   at least one bypass conduit branching off the at least one exhaust gas recirculation conduit upstream of the turbine for carrying exhaust gas during recirculation and opening into the exhaust gas conduit downstream of the turbine;
   at least one particulate filter arranged in the at least one exhaust gas recirculation conduit upstream of the branch of the at least one bypass conduit or in the exhaust gas conduit upstream of the at least one exhaust gas recirculation conduit,
   wherein the at least one particulate filter has a catalytically acting coating for converting CO, HC and NOx;
   an EGR valve is provided in the at least one exhaust gas recirculation conduit, which, depending on an operating point, adjusts an exhaust gas mass stream inside the at least one exhaust gas recirculation conduit, wherein the EGR valve is positioned downstream of the branch of the bypass conduit;
   a bypass throttle valve is provided in the at least one bypass conduit, which, depending on the operating point, adjusts the exhaust gas mass stream inside the at least one bypass conduit; and
   a cooler provided inside the at least one exhaust gas recirculation conduit downstream of the at least one particulate filter;
   wherein the cooler is positioned downstream of the branch of the at least one bypass conduit, and upstream of the EGR valve,
   and wherein an exhaust gas catalytic convertor is provided downstream of the turbine, wherein the exhaust gas catalytic convertor is a three-way catalytic converter.

18. An emissions control system for a gasoline engine, comprising: an exhaust gas conduit connectable to an exhaust manifold of the gasoline engine, having;
   an inlet conduit connected to an inlet manifold of the gasoline engine;
   a turbine arranged in the exhaust gas conduit;
   at least one exhaust gas recirculation conduit branching off upstream of the turbine and opening into the inlet conduit downstream of the compressor;
   at least one bypass conduit branching off the at least one exhaust gas recirculation conduit upstream of the turbine for carrying exhaust gas during recirculation and opening into the exhaust gas conduit downstream of the turbine;
   at least one particulate filter arranged in the at least one exhaust gas recirculation conduit upstream of the branch of the at least one bypass conduit or in the exhaust gas conduit upstream of the at least one exhaust gas recirculation conduit,
   wherein the at least one particulate filter has a catalytically acting coating for converting CO, HC and NOx;
   an EGR valve is provided in the at least one exhaust gas recirculation conduit, which, depending on an operating point, adjusts an exhaust gas mass stream inside the at least one exhaust gas recirculation conduit,
   wherein the EGR valve is positioned downstream of the branch of the bypass conduit;
   a bypass throttle valve is provided in the at least one bypass conduit, which, depending on the operating point, adjusts the exhaust gas mass stream inside the at least one bypass conduit; and a cooler provided inside the at least one exhaust gas recirculation conduit downstream of the at least one particulate filter;
   wherein the cooler is positioned downstream of the branch of the at least one bypass conduit, wherein an additional exhaust gas recirculation conduit is provided with an additional EGR valve, which branches off at the at least one exhaust gas recirculation conduit or which branches off at the at least one bypass conduit,
   wherein the additional exhaust gas recirculation conduit opens into the inlet conduit upstream of the compressor, and
   wherein an exhaust gas catalytic convertor is provided downstream of the turbine, wherein the exhaust gas catalytic convertor is a three-way catalytic converter.

19. An emissions control system for a gasoline engine, comprising:
- an exhaust gas conduit connectable to an exhaust manifold of the gasoline engine, having;
- an inlet conduit connected to an inlet manifold of the gasoline engine;
- a turbine arranged in the exhaust gas conduit; at least one exhaust gas recirculation conduit branching off upstream of the turbine and opening into the inlet conduit upstream of the compressor;
- at least one bypass conduit branching off the at least one exhaust gas recirculation conduit upstream of the turbine for carrying exhaust gas during recirculation and opening into the exhaust gas conduit downstream of the turbine;
- at least one particulate filter arranged in the at least one exhaust gas recirculation conduit upstream of the branch of the at least one bypass conduit or in the exhaust gas conduit upstream of the at least one exhaust gas recirculation conduit,
- wherein the at least one particulate filter has a catalytically acting coating for converting CO, HC and NOx;
- an EGR valve is provided in the at least one exhaust gas recirculation conduit, which, depending on an operating point, adjusts an exhaust gas mass stream inside the at least one exhaust gas recirculation conduit, wherein the EGR valve is positioned downstream of the branch of the bypass conduit;
- a bypass throttle valve is provided in the at least one bypass conduit, which, depending on the operating point, adjusts the exhaust gas mass stream inside the at least one bypass conduit; and
- a cooler provided inside the at least one exhaust gas recirculation conduit downstream of the at least one particulate filter;
- wherein the cooler is positioned downstream of the branch of the at least one bypass conduit, and wherein an exhaust gas catalytic convertor is provided downstream of the turbine, wherein the exhaust gas catalytic convertor is a three-way catalytic converter.

* * * * *